United States Patent Office 3,053,632
Patented Sept. 11, 1962

3,053,632
HYDROGEN PEROXIDE STABILIZATION
Robert E. Meeker, Berkeley, Calif., assignor to Shell Oil Company, a corporation of Delaware
No Drawing. Filed Dec. 14, 1959, Ser. No. 859,125
10 Claims. (Cl. 23—207.5)

This invention relates to methods of inhibiting the loss of hydrogen peroxide by decomposition during storage, transportation and use. It deals with new stabilizers which are highly effective in retarding decomposition of hydrogen peroxide in all concentrations.

A large variety of organic and inorganic stabilizers have been suggested for use in suppressing the decomposition of hydrogen peroxide which in the absence of suitable stabilizers is subject to serious loss on this account. Inorganic stabilizers have been generally preferred because, as a class, they are less subject to attack by the hydrogen peroxide being stabilized. The present invention provides a new class of organic stabilizers which are resistant to such attack and have a long effective life in hydrogen peroxide even at relatively high temperatures.

In accordance with the invention hydrogen peroxide is stabilized by adding thereto a stabilizing amount of an 8-hydroxyquinoline which is substituted in the 2-position by a saturated hydrocarbon radical. It was surprising to find that 8-hydroxyquinolines which are substituted in this way have a long effective life as a hydrogen peroxide stabilizer, since the unsubstituted 8-hydroxyquinoline has an impractically short inhibitor life especially at the elevated temperatures at which peroxide inhibitors are normally tested to determine their usefulness.

It is believed that the superiority of the new inhibitors of the invention is due to the protection which the substituent in the 2-position provides against oxidative attack by the hydrogen peroxide on the quinoline nitrogen atom in the molecule. The substituents used in the inhibitors provide a selective protection of the cyclic amine group, sharply retarding its rate of oxidation to N-oxide without interfering with the effectiveness of the inhibitor as a hydrogen peroxide stabilizer.

A variety of saturated hydrocarbon groups can be substituted in the 2-position of the new inhibitors. Saturated aliphatic or cycloaliphatic or alicyclic hydrocarbon are all useful. Thus one can advantageously use 8-hydroxyquinolines substituted in the 2-position by alkyl, cyclohexyl, cyclohexylalkyl, alkylcyclohexyl or like radicals. The substituent used to shield the nitrogen atom should not be so bulky, however, as to interfere sterically with the ability of the compound ot complex with metal ions since the effectiveness of the inhibitor as a peroxide stabilizer is then decreased. Hydrocarbon substituents in the 2-position having 1 to 9 carbon atoms can be used, but most advantageous as a rule are those with 1 to 6 carbon atoms. The substituent in the 2-position can be linked to the 8-hydroxyquinoline structure at another position as well, as in the case with 10-hydroxy-2,3,4,5-tetrahydroacridine and related compounds, for instance, but as a rule it is most advantageous to use 8-hydroxyquinolines which have as a substituent a saturated hydrocarbon radical linked to the ring only at the 2-position.

Other substituents can be present in the 2-substituted-8-hydroxyquinolines which are added to the peroxide. For example it is sometimes desirable to sulfonate the stabilizer to improve its solubility in aqueous stock solutions and in the $H_2O_2$ solution to be stabilized. Such sulfonation is especially helpful if the substituent is a large hydrocarbon group which otherwise limits the solubility of the stabilizer in aqueous solutions. An example of such a sulfonated stabilizer is 2-amyl-8-hydroxyquinoline-5-sulfonic acid.

Most advantageously the other substituents, if any, on the 2-saturated hydrocarbyl-8-hydroxyquinoline are also oxidation resistant since consumption of hydrogen peroxide in oxidation of the other substituent or substituents is then avoided. However, since it is usually necessary to use only very small amounts of the new peroxide inhibitors, the loss of peroxide in oxidation of oxidizable substituents will be negligible. On this account one may use starting 8-hydroxyquinolines which have in the molecule one or more substituents which react with hydrogen peroxide. It is only important, in other words, to have present in the peroxide being stabilized, a compound having the 8-hydroxyquinoline ring structure with a saturated hydrocarbon substituent in the position alpha to the ring nitrogen.

Ordinarily about 1 to about 250 milligrams of the 2-saturated hydrocarbyl-8-hydroxyquinoline, or mixture of such quinolines, per liter of the hydrogen peroxide being stabilized is adequate to stabilize the peroxide against excessive loss by decomposition during storage, transportation or use. In some cases, however, larger amounts up to about 1000 milligrams per liter of peroxide may be useful. Amounts of the order of about 25 to about 150 milligrams per liter will usually be most advantageous.

The new inhibitors can be incorporated into the hydrogen peroxide in any suitable way. Control of the concentration of the inhibitor in the peroxide is most easily achieved in large scale operations by preparing a stock solution of the substituted 8-hydroxyquinoline in water or hydrogen peroxide which is then added in controlled amounts to the hydrogen peroxide which is to be stabilized. However, one can add the inhibitor directly to the hydrogen peroxide being stabilized. Acids increase the solubility of the inhibitors in peroxide and may be added therewith for this purpose as well as to control the pH of the peroxide since hydrogen peroxide is more stable under acid than under alkaline conditions.

The invention is further illustrated by the following examples showing some of the suitable methods by which it may be applied. The Z numbers which are quoted refer to the unit which the industry has adopted in setting up a stability specification for hydrogen peroxide and refers to the decomposition losses in an accelerated test during 24 hours at 100° C. The initial Z number is the $H_2O_2$ decomposition rate during the effective lifetime of the inhibitors, expressed in units of percent loss of $H_2O_2$ per 24 hours at 100° C. The effective life of an inhibitor is the number of hours at 100° C. until breakdown of the inhibitor, as evidenced by a substantial increase in the $H_2O_2$ decomposition rate. The final Z number is the $H_2O_2$ decomposition rate after breakdown of the inhibitor or, if no breakdown occurs, at the end of the test, again expressed as percent per 24 hours. The pH values given are the direct readings obtained when using a pH meter with glass and calomel electrodes and should be corrected for $H_2O_2$ concentration effects as described by Kolczynski et al., J. Am. Chem. Soc., vol 79, 531 (1957), to obtain the aqueous equivalent pH value of the hydrogen peroxide solution.

*Example 1*

Comparative tests were made of the effectiveness of 50 milligrams per liter of 8-hydroxyquinoline and 2-methyl-8-hydroxyquinoline (8-hydroxyquinaldine) as stabilizers for 35% hydrogen peroxide containing 110 milligrams of sodium pyrophosphate and 4.5 mg. of aluminum ion per liter of solution.

Each test sample was prepared in a 100-ml. volumetric flask by adding aliquots of concentrated stock solutions of the additives to the peroxide solution. The pH was adjusted by adding either $HNO_3$ or $NH_4OH$ in amounts determined by titration of a duplicate solution. After thorough mixing, the solution was divided. Half was used for the decomposition rate determination, and the other half was used for pH measurement. This technique avoided contamination of the test solution by the pH meter electrodes.

All glassware used in contact with the test solutions or the additive stock solutions was thoroughly cleaned and passivated. The glassware was contacted successively with 10% NaOH, 35% $HNO_3$, and 90% $H_2O_2$, each for about 24 hours at room temperature, with deionized water rinses between. The treatment was repeated each time the glassware was used.

| Added Inhibitor | Direct pH reading | Z Number | | Effective life of Inhibitor at 100° C., hours |
|---|---|---|---|---|
| | | Initial | Final | |
| None | 2.5 | 7 | 14 | |
| 8-Hydroxyquinoline | 2.5 | 1.6 | 11 | 10 |
| 2-methyl-8-Hydroxyquinoline | 2.5 | 1.4 | 7.2 | 46 |

*Example II*

Tests carried out similarly to those described in Example I but using 35% hydrogen peroxide contaminated with 0.02 milligram per liter of copper and 8-hydroxyquinoline or 2-methyl-8-hydroxyquinoline as the only inhibitors, gave the following results:

| Inhibitor | Direct pH reading | Z Number | | Effective life of Inhibitor at 100° C., hours |
|---|---|---|---|---|
| | | Initial | Final | |
| None | 2.5 | 80 | 80 | |
| 8-Hydroxyquinoline | 2.3 | 4.1 | 60 | 12 |
| 2-Methyl-8-hydroxyquinoline | 2.5 | 1.1 | 3.6 | ¹ 22+ |

¹ The inhibitor did not break down within the test period as did the 8-hydroxyquinoline but was still effective when the test was terminated after 22 hours at 100° C.

Using 2-ethyl-8-hydroxyquinoline as the inhibitor under the same conditions gives hydrogen peroxide with a like good stability.

*Example III*

The effectiveness of the new stabilizers with concentrated hydrogen peroxide is shown by the following results with 90% hydrogen peroxide containing 0.005 milligram of iron and 0.002 milligram of copper per liter as impurities. The tests were conducted as described in Example I, except that no pyrophosphate or other inhibitor was present. Note that 8-hydroxyquinoline gave no improvement over the unstabilized blank, and even broke down after seven hours at 100° C. to products that strongly catalyzed the decomposition of $H_2O_2$. The stabilizer of the invention, however, the 2-methyl-8-hydroxyquinoline, provided excellent stabilization for 33 hours at 100° C. After that, the $H_2O_2$ decomposition rate increased somewhat, but remained lower than that of the blank.

| Inhibitor | Direct pH reading | Z Number | | Effective life of Inhibitor at 100° C., hours |
|---|---|---|---|---|
| | | Initial | Final | |
| None | 0.5 | 4.1 | 4.1 | |
| 8-Hydroxyquinoline | 0.4 | 5.8 | 29 | 7 |
| 2-Methyl-8-Hydroxyquinoline | 0.5 | 0.41 | 2.8 | 33 |

Under the same conditions but using only 10 milligrams per liter of 2-methyl-8-hydroxyquinoline and a pH of 0.7, the initial and final Z numbers were 3.6, respectively, and the effective life of the inhibitor at 100° C. was 27 hours. With 1 milligram per liter of the 2-methyl-8-hydroxyquinoline and a direct pH reading of 0.6 the life of the inhibitor was still greater than 24 hours, the initial and final Z numbers both being 3.2. Especially when the $H_2O_2$ to be stabilized is highly contaminated with catalytic metal ions, iron in particular, a combination of a phosphate and dissolved aluminum which can be added in the form of its soluble salts, for instance the sulfate, nitrate, or the like, in amounts of about 1 to about 10 milligrams of aluminum per liter of hydrogen peroxide is particularly useful with the new inhibitors.

*Example IV*

Highly contaminated hydrogen peroxide (0.10 milligram of iron and 0.02 milligram of copper per liter) of 35% concentration (uninhibited blank Z number=1000) was stabilized by addition of 50 milligrams of 2-methyl-8-hydroxyquinoline per liter together with 5 milligrams of aluminum, added as aluminum sulfate, and 110 milligrams of sodium pyrophosphate per liter. The initial Z number determined by the test method described in Example I was 1.0. The inhibitors did not break down in this severe test; when the test was ended after 20 hours at 100° C., the final Z number was only 2.5.

For comparison, when the pyrophosphate and aluminum ions were omitted, the Z number was 180. Also for comparison, when the older inhibitor 8-hydroxyquinoline was used instead of the 2-substituted compound of the invention, the Z number was 300. Adding pyrophosphate and aluminum ions also improved the results with 8-hydroxyquinoline somewhat, but the inhibitors broke down after only 12 hours at 100° C.

Thus there are special advantages in using the new inhibitors together with about 1 to about 1000 milligrams per liter of peroxide of an inorganic chelating agent for ion, such for instance as sodium pyrophosphate or other phosphate salts, for example sodium orthophosphate, sodium hexametaphosphate and sodium tetrametaphosphate. Other inorganic iron-chelating agents which are useful in combination with the new inhibitors include sodium stannate and sodium silicate. Still other stabilizers which can be used advantageously in combination with the new inhibitors include 1,2-diaminocyclohexane-N,N,N',N'-tetraacetic acid, ethylenediaminetetraacetic acid and the like.

Typical examples of other 2-substituted-8-hydroxyquinolines which can be used in the same way as the inhibitors of the foregoing examples, to stabilize hydrogen peroxide successfully, are, for instance: 2,5-dimethyl-8 - hydroxyquinoline, 2-phenyl - 8 - hydroxyquinoline, 2-cyclohexyl-8-hydroxyquinoline, 2-nonyl-8-hydroxyquinoline-5-sulfonic acid.

Still other variations can be made in the invention which is not restricted to the foregoing illustrative examples nor by any theory proposed in explanation of the improved results which are obtained.

I claim as my invention:

1. Hydrogen peroxide containing as stabilizer about 1 to about 1000 milligrams per liter of 8-hydroxyquinoline having in the 2-position a saturated hydrocarbon group of 1 to 9 carbon atoms.

2. Hydrogen peroxide containing as stabilizer about 1 to about 1000 milligrams per liter of 8-hydroxyquinoline having a saturated hydrocarbon radical of 1 to 9 carbon atoms linked to the ring only at the position alpha to the nitrogen atom.

3. Hydrogen peroxide containing as stabilizer about 1 to about 1000 milligrams per liter of 2-alkyl-8-hydroxyquinoline wherein the alkyl group has from 1 to 5 carbon atoms.

4. Hydrogen peroxide containing as stabilizer about 1 to about 1000 milligrams per liter of 2-methyl-8-hydroxyquinoline.

5. Hydrogen peroxide containing as stabilizer about 1 to about 1000 milligrams per liter of 2-ethyl-8-hydroxyquinoline.

6. Hydrogen peroxide containing as stabilizer about 1 to about 1000 milligrams per liter of 2-cyclohexyl-8-hydroxyquinoline.

7. A method of stabilizing aqueous hydrogen peroxide which comprises adding thereto about 1 to about 1000 milligrams per liter of 8-hydroxyquinoline substituted in the 2-position by a saturated hydrocarbon group of 1 to 9 carbon atoms.

8. A method in accordance with claim 7 wherein the hydrogen peroxide also contains about 1 to about 1000 milligrams per liter of an inorganic chelating agent for iron.

9. A method in accordance with claim 7 wherein the hydrogen peroxide also contains about 50 to about 500 milligrams of sodium pyrophosphate and about 1 to about 10 milligrams of dissolved aluminum per liter.

10. Hydrogen peroxide of pH about 0.4 to about 2.5, direct meter reading value, containing as stabilizer about 1 to about 1000 milligrams per liter of 2-methyl-8-hydroxyquinoline together with about 50 to about 500 milligrams per liter of sodium pyrophosphate and about 1 to about 10 milligrams per liter of dissolved aluminum.

References Cited in the file of this patent

UNITED STATES PATENTS

| | | |
|---|---|---|
| 2,783,132 | Panepinto | Feb. 26, 1957 |
| 2,961,306 | Johnston | Nov. 22, 1960 |

OTHER REFERENCES

Chaberek and Martell: "Organic Sequestering Agents," published by John Wiley and Sons, Inc., New York, pages 489–490, 1959.